(12) United States Patent
Tanaka (10) Patent No.: US 6,238,564 B1
(45) Date of Patent: May 29, 2001

(54) SLUDGE TREATMENT METHOD (76) Inventor: Yonemi Tanaka, 3138-banchi, Ooaza-Naka, Kitano-machi, Mii-gun, Fukuoka-ken (JP)

( * ) Notice: Subject to any disclaimer, the term of this patent is extended or adjusted under 35 U.S.C. 154(b) by 0 days.

(21) Appl. No.: 09/097,584

(22) Filed: Jun. 16, 1998

(30) Foreign Application Priority Data

Jun. 17, 1997 (JP) .................................................. 9-177583
May 18, 1998 (JP) ................................................. 10-151949

(51) Int. Cl.[7] .............................. C02F 3/00; C02F 3/02; C02F 9/00; C02F 1/24
(52) U.S. Cl. ......................... 210/608; 210/609; 210/620; 210/631; 210/705
(58) Field of Search .................................. 210/609, 631, 210/608, 707, 705, 616, 620, 776

(56) References Cited

U.S. PATENT DOCUMENTS

| | | | |
|---|---|---|---|
| 3,876,536 | * | 4/1975 | Pradt et al. ........................... 210/609 |
| 4,168,228 | * | 9/1979 | Mallatt et al. ........................ 210/631 |
| 4,292,176 | * | 9/1981 | Grutsch et al. ....................... 210/631 |
| 4,407,717 | * | 10/1983 | Teletzke et al. ..................... 210/631 |
| 5,804,076 | * | 9/1998 | Yamasaki et al. .................... 210/609 |
| 5,876,613 | * | 3/1999 | Bonnin et al. ........................ 210/609 |

OTHER PUBLICATIONS

Asahi Newspaper of Dec. 6, 1997, p. 3 Japan.

* cited by examiner

*Primary Examiner*—Chester T. Barry
(74) *Attorney, Agent, or Firm*—Browdy and Neimark

(57) ABSTRACT

The present invention relates to a treatment method of sludge, comprising adding and mixing carbide in powder and/or particulate (carbon-containing materials, being porous and of a light weight, produced by baking in a covered pan organic matters such as used tire and rubber other than active charcoal) with sludge to adsorb and float up the sludge, and separating the sludge, and unlike conventional methods for precipitating and separating sludge by using coagulants such as Al and Ca salts and the like, no such coagulants are required, so that the separated sludge is highly safe and can be prepared as compost for recycling, and thus, highly costly incineration disposal or dumping as has been carried out conventionally is not any more needed.

16 Claims, 5 Drawing Sheets

SLUDGE TREATMENT METHOD

DETAILED DESCRIPTION OF THE INVENTION

1. Technical Field of the Invention

The present invention relates to a sludge treatment method. In accordance with the present invention, the bulking phenomenon having been a taboo conventionally in the industry is conversely utilized, on the basis of an absolutely novel idea.

More specifically, the present invention relates to a sludge treatment method, characterized in that
(1) for concentrating excess sludge and the like, the sludge and the like are never precipitated or concentrated through the addition of coagulants and the like as carried out conventionally but the sludge is on contrast adsorbed on carbide to coagulate the sludge and additionally, the coagulated matter of coagulated sludge is floated up by means of gas generated through biological actions in the sludge to intend to separate the sludge from treated water, thereby attaining the recycling of sludge;
(2) the water in the coagulated matter is reduced to make sludge treatment more readily carried out; and
(3) the occurrence of smell during coagulation and separation is further prevented,
and the present invention relates to
(4) a method for producing compost by utilizing Actinomycetes as a means of recycling of sludge floated up and separated in such manner.

2. Prior Art

Liquid waste disposal essentially involves the generation of sludge. So as to finally dispose the sludge, for example so as to incinerate the sludge, treatments such as dehydration and drying are required.

Generally, the water content in sludge generated via precipitation and separation is 98% or more, and because the water content is so high, sludge should necessarily be dehydrated for final disposal.

As a preliminary treatment of dehydration, conventionally, a method has been known, comprising adding a coagulant into a sludge mixture solution and precipitating and concentrating the solution, and the method has been practiced at disposal plants at large scales, such as night soil treatment plants, sewage treatment plants or food plants.

Furthermore, excess sludge at small scale purifying facilities at small companies and private houses is wholly brought into sewage treatment plants at large scales, where the same treatment as described above is effected.

According to the conventional methods as described above, it is required that sludge has good precipitability enough to be separated readily from treated water in sedimentation tanks, and if a bulking (expansion) phenomenon, ie. abnormal sludge floating up phenomenon occurs, the precipitability is extremely deteriorated; if SVI (sludge volume index) is 200 or more, for example, the separation in sedimentation tanks is deteriorated, to finally cause that the treatment cannot be continued.

According to the conventional methods, therefore, the floating up of sludge is an abnormal phenomenon, and the floating up of sludge means that the treatment cannot be continued any more, so the floating up of sludge is a taboo and the prevention thereof is inevitable.

In accordance with the present invention, meanwhile, the floating up of sludge is actively utilized, so the conventional state of art is broken through, and thus, the present invention is truly innovative.

PROBLEMS THAT THE INVENTION IS TO SOLVE

The method for precipitation and concentration, having been carried out conventionally, comprises adding coagulants such as aluminium and calcium salts and the like to a sludge mixture solution, thereby coagulating sludge in the sludge mixture solution and separating the sludge, and therefore, the separated coagulated matters contain salts and the like. When the separated coagulated matters are back to cultivating fields of rice or vegetable, therefore, damages due to high concentrations of salts may occur; or the coagulated matters cannot be prepared as compost because the matters contain components hazardous to plants, and as described above, the recycling has been limited.

Hence, the separated sludge mostly has to be dried and then incinerated and dumped, but even in this case, the occurrence of secondary pollution due to the remaining salts and the like cannot be avoided and the difficulty in selecting dumping sites and the escalation of the running cost following the site selection are problematic.

The present invention has been attained with the objects of overcoming these problems.

MEANS FOR SOLVING THE PROBLEMS

So as to attain the objects, the present inventors have newly put up a technical subject such that a method for coagulating sludge with no use of coagulants is to be developed, and as the consequence of examination from individual standpoints, the inventors have recognized that an innovative idea should be required and have focused their attention to an abnormal phenomenon (bulking) such that if a sludge mixture solution at a per-aerated state is left to stand in a sedimentation tank, a part of sludge floats up. According to the conventional treatment method for precipitating and coagulating sludge and then separating the sludge, the phenomenon has been a taboo because it blocks the treatment.

By actively focusing their attention to the bulking phenomenon, the prevent inventors added active charcoal in powder or particulate (into a sludge mixture solution) and mixing and agitating them together (for one example, adding active charcoal at 0.2 w/v %), and then, the sludge was adsorbed on the active charcoal, so that the whole sludge began to float up in about 24 hours, while a transparent solution was observed at the bottom layer, and the floating up sludge could be scooped out in a simple manner, and by additionally filtering the whole agitated mixture solution after the treatment, not by scooping out only sludge, filtration was promoted in a very smooth manner quite unexpectedly, so that the inventors have got a useful finding that the active charcoal deposited with sludge and the transparent liquid could be readily separated from each other.

The present inventors have got a novel technical idea to float up sludge for removal, which is absolutely contrary to the conventionally common methods for precipitating and removing sludge, and have got a novel finding that the addition of active charcoal at a small specific gravity and the like in that case could further promote the effect of floating up and removing sludge by making sludge to be adsorbed and coagulated on the active charcoal and the like, and as the outcome of further research works based on these useful new findings, the inventors have attained the present invention.

The present invention will be described below in more detail.

So as to practice the present invention, carbide such as active charcoal is added to a sludge mixture solution to adsorb sludge onto the carbide to coagulate and float up the sludge, which is then separated by means including for example scooping out, so that a transparent treated solution can be recovered. In accordance with the present invention, thus, the carbide with sludge adsorbed thereon floats up, while a layer of a transparent solution is formed on the bottom layer and a spatial part is formed on the intermediate layer, and in addition to the separation of the floating up sludge layer in separation alone and the separation of the transparent solution alone, the entirety can be filtered and separated by centrifugation and the like, in accordance with the present invention, and therefore, an effect such that solids and liquids are extremely efficiently separated can be brought about.

As the mechanism of such efficient floating up of sludge, it was demonstrated that carbide such as active charcoal adsorbed sludge and that sludge then absolutely floated up due to the action of $N_2$, $N_2O$, $CO_2$ $O_2$ and the like generated from the reduction of nitrous acid and nitric acid in a sludge mixture solution.

As such carbide, all the substances enriched with carbon as recovered by carbonizing organic substances are referred to, typically including active charcoal with a small specific gravity and a large surface area and additionally including charcoal and bone charcoal, recovered by steam boiling wood and bone; carbides recovered by steam boiling newspaper, waste paper, magazines and residues of paper making process at paper plants, used tire, rubber, synthetic resins and the like; similarly including bamboo charcoal, wood waste charcoal, pulp charcoal, palm shell charcoal; pitch, humic acid powder, peat, carbon black and the like, which are only by way of illustration but not intended to be limiting. (Herein, active charcoal is described as an example of carbide hereinbelow.)

By the sludge treatment method described above, carbide to be added to a sludge mixture solution at an aerated state or after aeration is at 0.01 to 5.0 w/v %, preferably at 0.3 to 1.0 w/v %.

If carbide is below 0.01 w/v %, the floating up velocity of sludge is slow; if above 5.0 w/v %, the economical burden of cost is escalated, uneconomically.

As has been described above, because $N_2$, $N_2O$, $CO_2$ and the like as generated from the reduction of nitric acid (nitrous acid) have a relation with the floating up of sludge, a design such that microorganisms responsible for the reduction of nitric acid (nitrous acid) and present in a sludge mixture solution should be grown has firstly been established so as to increase the efficiency of the floating up of sludge. Therefore, then, microorganisms of themselves (including cultures; sludge as such is encompassed in cultures) should be added to a sludge mixture solution, and additionally, nitric acid (nitrous acid) (salts) may satisfactorily be added, which functions as the substrate therefor.

As has been described above, additionally, $CO_2$ has a relation with the floating up of sludge, and therefore, screening was made of yeast and bacteria in daily life liquid waste. Then, genera Candida, Endomycopsis, and Zymomonas were found to generate carbonate gas. In the same manner as described above, then, active charcoal was added and further, sugar materials were added into the sludge mixture solution, so that the whole sludge began to float up about 24 hours later, while on the bottom layer was observed a transparent solution.

So as to elevate the efficiency of the floating up of sludge, therefore, the aforementioned microorganisms of themselves (including cultures and sludge of themselves) and the sugar materials functioning as the substrate may satisfactorily be added.

As has been described above, the significance of the addition of nitric acid (nitrous acid) (salts) has firstly be demonstrated in accordance with the present invention, and so as to confirm the point, the following experiments were carried out additionally.

FUNDAMENTAL EXPERIMENTAL EXAMPLE 1

<With respect to a method for separating sludge comprising adding nitrous acid, nitric acid, nitrate salts and or sugar materials to a sludge mixture solution thereby floating up and separating sludge>

It is known that the amount of nitrous acid in a back sludge mixture solution is generally at 0.2 to 0.4 ppm. Additionally, it is known that the amount of sugar materials in a back sludge mixture solution is 1.0 ppm or less. Hence, it has been found that the numbers of individual microorganisms in a sludge mixture solution have deep relation with the culturing time. The change of the numbers of microorganisms is shown in Table 1.

TABLE 1

| Culture duration | 0 hr. | 5 hr. | 10 hr. | 30 hr. |
| --- | --- | --- | --- | --- |
| Photosynthetic bacteria | 450 | 560 | 1260 | 2850 |
| Albumin degradation bacteria | 600 | 650 | 1450 | 1320 |
| Sulfur oxidation bacteria | 470 | 620 | 1120 | 1480 |
| Ammonia oxidation bacteria | 1146 | 1224 | 1330 | 2350 |
| Nitrous acid oxidation bacteria | 8 | 10 | 14 | 30 |
| Nitrous acid · nitric acid reductive bacteria | 96 | 97 | 76 | 55 |
| Yeast | 18 | 20 | 22 | 25 |

The unit of microbial cell number is $\times 10^2$/ml.

Table 1 shows the change of the cell numbers ($\times 10^2$/ml) of microbes involved in the nitrogen cycle and the carbonate gas generation in a sludge mixture solution when a mixture of equal volumes of a sludge mixture solution in a joint purifying tank transferred from a night soil treatment plant (200 t/day) and a back sludge mixture solution was used.

Into the sludge mixture solution was added active charcoal at 0.2 w/v %, followed by individual addition of nitrous acid, nitric acid or salts thereof, or glucose, starch and the like, and the effect on the floating up of sludge solid matters was examined in this case. Consequently, FIG. 1 shows the effect of 4% addition of 0.1 N nitrate salts, and FIG. 2 shows the effect of 0.1 w/v % addition of each of glucose and starch.

Figure 1:
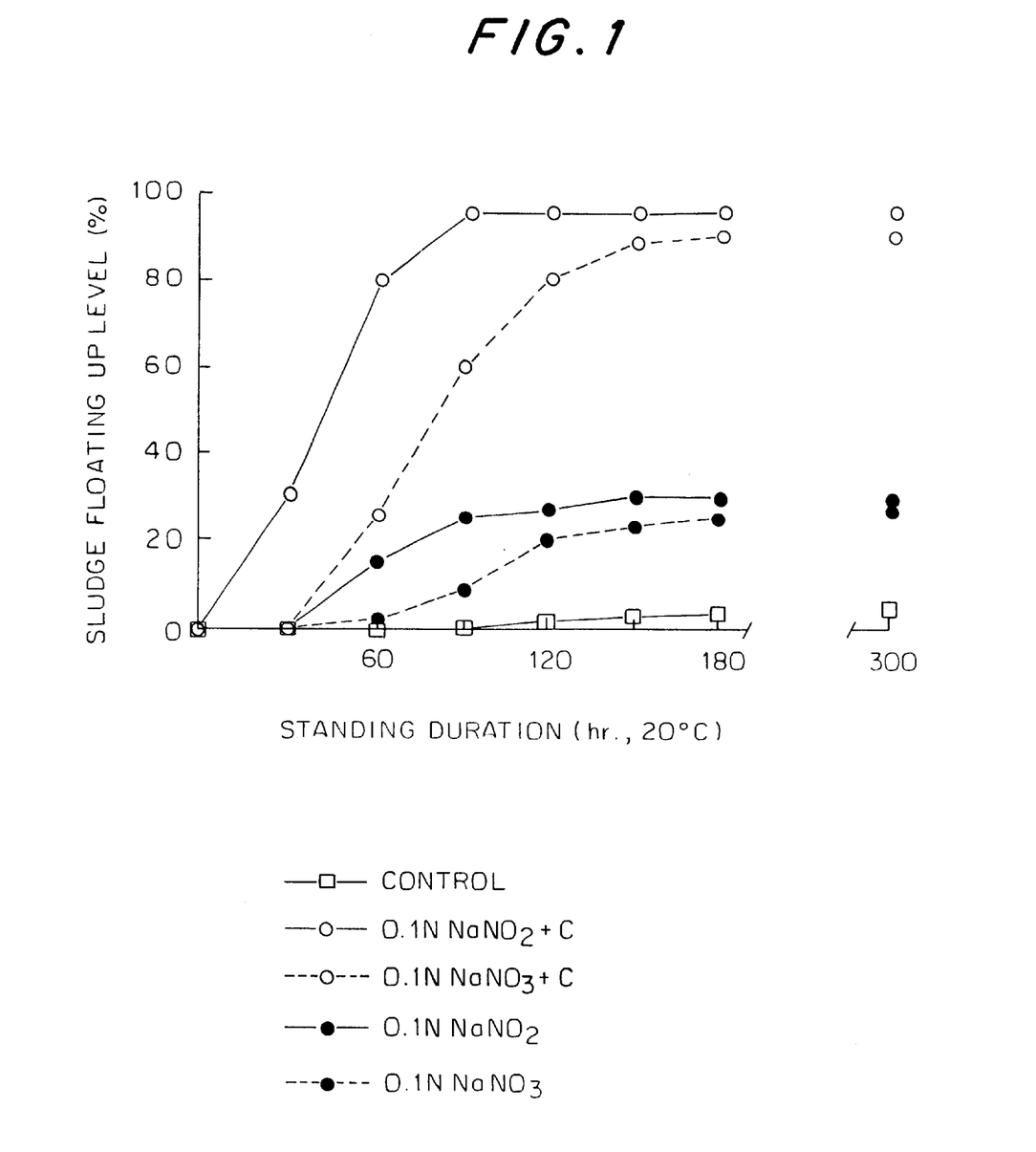
FIG. 1 shows graphs depicting the effects of nitrate salts and active charcoal over the floating up of sludge mixture solution.
Figure 2:
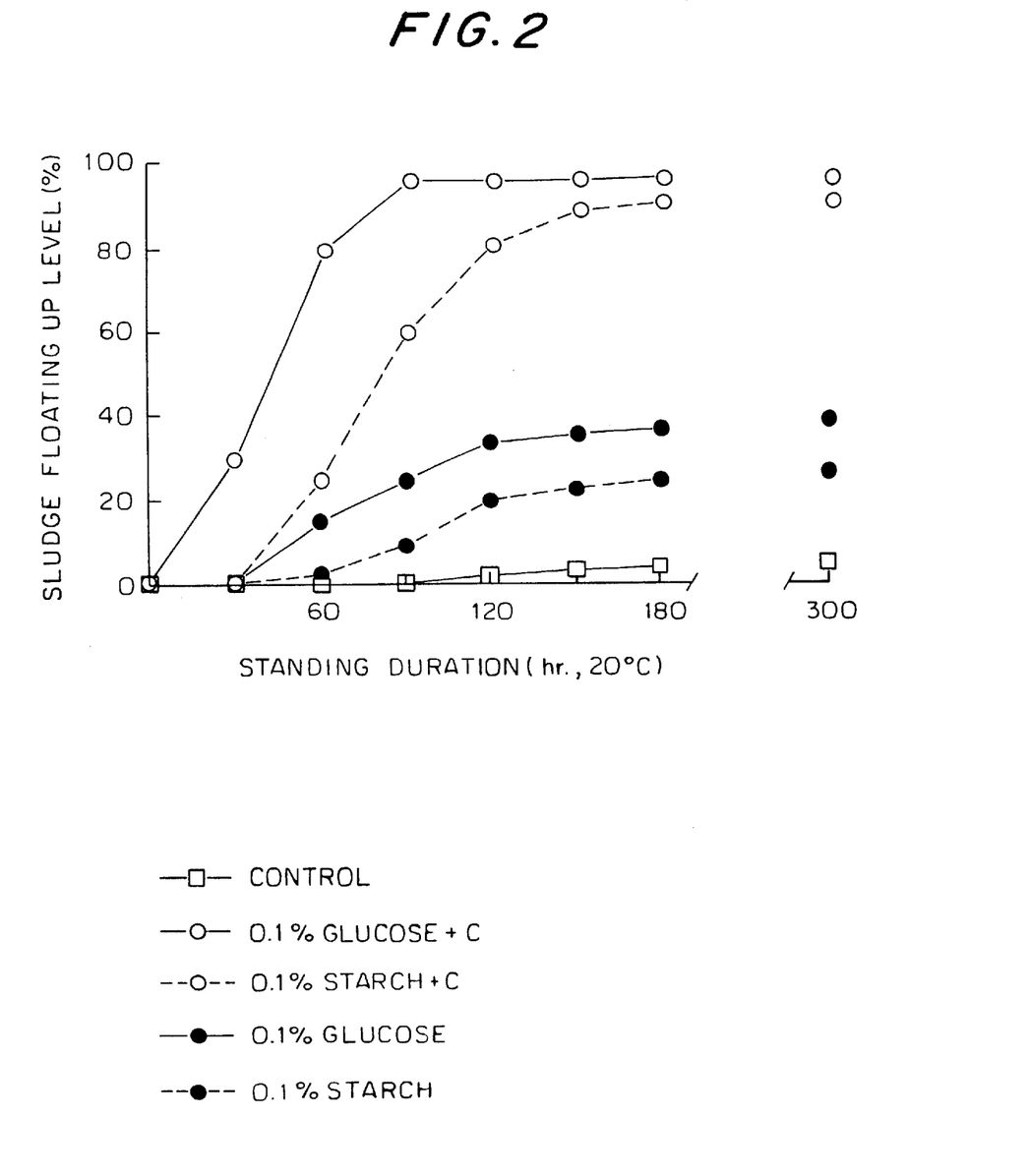
FIG. 2 shows graphs depicting the effects of glucose in combination with active charcoal and starch in combination with active charcoal over the floating up of sludge mixture solution.

In both FIGS. 1 and 2, the effects of nitrate salts in combination with active charcoal and glucose in combination with active charcoal on the floating up of a sludge mixture solution were examined by using a sludge mixture solution back from a night soil treatment plant (200 t/day).

According to these figures, the floating up level through the addition of only 0.1 N nitrous acid and nitrate salts in solution at 4% was at 5 to 20%, but the floating up level reached 80% or more, 5 days after active charcoal was simultaneously added. Three days later, the level reached 99% or more in the latter case. The amount of solids floating up 3 days after glucose was added at 0.1% instead of nitrate salts reached 99% or more.

FUNDAMENTAL EXPERIMENTAL EXAMPLE 2
<With respect to the change of the composition of floating up sludge and the change of the absorbance of separated solution through the addition of nitric acid and nitrous acid>

A back sludge mixture solution from an urban purifying tank (the amounts of nitric acid and nitrous acid were at 0.4 ppm) was placed in three 50-ml Nessler tubes, followed by addition of a 0.1 N nitrous acid solution and a 0.1 N nitric acid solution individually at 2%. Furthermore, active charcoal was added further into these tubes at 0.2%, 0.1% and 0.05%, for measuring the absorbance of the separated solutions at 20° C., 3 days later.

The results of the measurement are shown in Table 2. Herein, the absorbance was measured of the supernatants after centrifugation at 1700×g for 10 minutes with a centrifuge.

present, active charcoal adsorbed on sludge initiates the floating up of sludge, while $NO_2$ and $NO_3$ are modified into $N_2$ and $O_2$, prior to the generation of bad odor. Additionally because active charcoal has a function to adsorb gases such as $O_2$ and $CO_2$ other than sludge and because the specific gravity of active charcoal is small, the resulting coagulated matters float up over the surface of the sludge-mixed liquid.

Because $N_2$ and $O_2$ ascend from the downward, the coagulated matters leave the liquid surface, so that the matters completely float up. The coagulated matters floating up are entirely in a porous structure, so that the water content in the coagulated matters is decreased.

Due to the action of microorganisms to modify sugar into carbonate gas, furthermore, $CO_2$ is generated, and the effect of pushing up the coagulated matters is enhanced due to the $CO_2$. If sugar and/or a saccharifying bacterium (culture) is added, then, the pushing up effect is further promoted.

Because photo-synthetic microorganisms of genera Chlorella, Spirogyra, and Hydrodictyon, and purple non-sulfur bacteria (e.g., Rhodospirillum rubrum IFO-3986) and the like are present in sludge mixture solutions, $CO_2$ is also modified into $O_2$, which promotes the ascending effect as well.

It was thus indicated that the coagulated matters floating up were overall in aerobic environment and could prevent the occurrence of bad odor generated in anaerobic environment. The present invention has been achieved on the basis of these findings.

More specifically, the present invention is characterized in that for concentrating excess sludge and the like, the sludge

TABLE 2

| Type of nitrate salt | Amount of active charcoal added (%) | Absorbance of separated water | | Composition of floating up sludge | | |
|---|---|---|---|---|---|---|
| | | 420 mm | 560 mm | Water (%) | Total nitrogen (%) | Crude protein (%) |
| Control sludege | 0 | 0.502 | 0.154 | — | — | — |
| 0.1N.NaNO$_2$ | 0.2 | 0.244 | 0.118 | 94.5 | 5.44 | 34.0 |
| 2% added solution | 0.1 | 0.264 | 0.123 | 93.7 | 6.18 | 38.6 |
| | 0.05 | 0.314 | 0.126 | 94.0 | 6.79 | 41.8 |
| 0.1N.NaNO$_3$ | 0.2 | 0.226 | 0.116 | 94.1 | 5.62 | 35.1 |
| 2% added solution | 0.1 | 0.260 | 0.122 | 93.8 | 6.14 | 38.4 |
| | 0.05 | 0.130 | 0.130 | 93.9 | 6.54 | 40.8 |

In Table 2, the transparency after addition of any of nitric acid salts and nitrous acid salts was better compared with the transparency of control sludge, and particularly, the transparency after 0.2% addition of active charcoal showed the best outcome.

Alternatively, the water content, total nitrogen and raw protein mass weight of the floating up sludge were measured, and as the results, no difference was observed in the water content between the types and addition amounts of nitrate salts. However, the levels of the total nitrogen and crude protein were at the highest values when active charcoal was added at 0.05%.

During the fundamental experiments, furthermore, what will be described below was also demonstrated. More specifically, sludge demands oxygen by active sludge method. Sludge is composed of groups of microorganisms, and once the supply of oxygen is suspended, enzymes present in the microorganisms of themselves degrade the microorganisms (autolysis). Then, bad odor specific to sludge starts to smell.

As has been described above, when active charcoal is added to sludge with addition of nitric acid or nitrous acid or is aerated so that nitric acid or nitrous acid might be and the like are never precipitated or concentrated through the addition of coagulants and the like as carried out conventionally but on the contrary, the sludge is adsorbed on carbide to coagulate the sludge and additionally, the coagulated matter of coagulated sludge is floated up by means of gas generated through biological actions in sludge to intend to separate the sludge from treated water, thereby attaining the recycling of sludge, Additionally, the present invention is characterized in that the water in the coagulated matter is reduced to make sludge treatment more readily carried out.

Still additionally, the present invention is characterized in that the occurrence of smell during coagulation and separation is further prevented.

Yet more additionally, the present invention is characterized in that the production of compost is attained as recycling of separated sludge and the production of a new type of safe compost containing carbon with no occurrence of pollution or chemical hazards on plants is firstly attained.

And the method of the present invention can be practiced more efficiently by utilizing a sludge treatment agent and a sludge treatment system as described below.

In accordance with the present invention, the bacteria to reduce nitric acid or nitrous acid include genera Micrococcus, Thiobacillus and Pseudomonas.

The microorganisms to generate carbonate gas from sugar materials include genera Candida, Kluyveromyces, Zymomonas, Endomycopsis (Saccharomycopsis) and Trichosporon.

Non-limiting examples of these microorganisms are as follows; *Micrococcus luteus* IFO 12992, *Thiobacillus thiooxidans* IFO 13724, *Pseudomonas denitrificans* IFO 13302, *Ps. fluorescens* IFO 3081, *Candida albicans* IFO 0197, *Kluyveromyces marxianus* IFO 0219, *Zymomonas mobilis* IFO 13756, *Saccharomycopsis monospora* IFO 0113, and *Trichosporon cutaneum* IFO 1500.

The photo-synthetic microorganisms present in sludge mixture solutions include for example genera Chlorella, Spirogyra, and Hydrodictyon, and purple non-sulfur bacteria (e.g., *Rhodospirillum rubrum* IFO-3986) and the like.

In accordance with the present invention, the individual microorganisms mentioned above are present in sludge mixture solutions, and therefore, it is needless to say that these microorganisms may satisfactorily be used as they are and these microorganisms may satisfactorily be added singly or in a mixture thereof. In that case, an isolated microorganism is used as such and additionally, the culture thereof (containing sludge mixture solutions) may satisfactorily be used; furthermore, the treated products thereof (concentrated products, pastry products, dried products, diluted products and the like) may also be used.

Nitrous acid, nitric acid and salts thereof singly or in combination to be added into a sludge mixture solution at an aerated state or a sludge mixture solution after aeration are at 5 to 10,000 ppm, preferably at 50 to 1,000 ppm. If less than 5 ppm, the sludge floating up rate is slow; above 10,000 ppm, the economical burden of cost is increased, uneconomically.

The sugar materials to be added into a sludge mixture solution at an aerated state or after aeration are at 0.1 to 5.0 w/v %, preferably at 0.2 to 1.0 w/v %. If the sugar materials are below 0.1 w/v %, the sludge floating up rate is slow; if exceeding 5.0 w/v %, the economical burden of cost is increased, uneconomically.

As the sugar materials, use is made of monosaccharides and/or polysaccharides, appropriately, and the non-limiting examples thereof include the following; glucose, fructose, sucrose, maltose, lactose, starch and dextrin and others.

The genera Micrococcus, Thiobacillus and Pseudomonas and the like to reduce nitrous acid or nitric acid to generate $N_2$ gas should be incubated or inoculated into a sludge mixture solution or a sludge treatment system (aeration tank or treatment tank) so that the number of viable bacteria might be $1\times10^2$/ml or more, preferably $3\sim10^5$ to $2\times10^8$/ml therein. In the case of aeration tank, the sludge mixture solution is prepared at that state and is then transferred to a sludge floating up and separation tank. If the number of the reductive bacteria is less than $1\times10^2$/ml, the sludge floating up rate is slowed down.

The bacteria generating $CO_2$ should be incubated or inoculated into a sludge mixture solution or a sludge treatment system (aeration tank or treatment tank) for generating $CO_2$ from sugar materials, so that the number of viable bacteria generating $CO_2$ might be $1\times10^2$/ml or more, preferably $2\sim10^3$ to $2\times10^5$/ml therein. In the case of aeration tank, the sludge mixture solution is prepared at that state and is then transferred to a sludge floating up and separation tank. If the number of yeast bacteria or the number of genus Zymomonas is less than $1\times10^2$/ml, the sludge floating up rate is slowed down.

Action

Charcoal in powder or particulate is added into a sludge mixture solution at an aerated state or after aeration. Charcoal gradually adsorbs sludge in the mixture solution, and after leaving the solution to stand for a while, the entire sludge is adsorbed and then starts to float up. The phenomenon is due to the adsorption of a great volume of sludge on charcoal and further due to the pushing up of the sludge from the downward owing to the buoyancy derived from the generated $N_2$, $CO_2$, $O_2$ and the like, because the specific gravity of carbon is very small and the surface area per unit weight is therefore large.

In such manner, the coagulated matters of sludge are collected on the upper layer, while the intermediate layer is spatial and a transparent solution appears on the bottom layer.

Thus, the floating up matters in coagulation of sludge are separated through the space from the treated water on the bottom layer and the water is less in the matters, and therefore, the matters can be treated like solid matters, which are readily separated.

In a sludge mixture solution at an aerated state or after aeration to which is further added charcoal, the source of generating $N_2$, $CO_2$, $O_2$ and the like resides in the nitrous acid or nitric acid in the sludge mixture solution and nitric acid, nitrous acid and salts thereof are additionally added singly or in combination extraneously, and therefore, $N_2$, $CO_2$, $O_2$ and the like are generated furthermore.

Therefore, the gases and the like generated more push up rapidly the floating up coagulated matters of sludge further upward to generate a spatial layer between the floating up coagulated matters of sludge and the remaining treated water. Consequently, the floating up sludge can be thoroughly separated from the treated water as the under layer and can be dried rapidly, so the resulting sludge can be subject to a treatment like solid matters, whereby the sludge can be more readily separated and drawn out.

In a sludge mixture solution at an aerated state or after aeration to which is firstly added sugar materials, followed by further addition of charcoal, the source of generating $N_2$, $CO_2$, $O_2$ and the like resides in the nitrous acid or nitric acid in the sludge mixture solution and the sugar materials are additionally added extraneously, and therefore, $N_2$, $CO_2$, $O_2$ and the like are generated furthermore.

Accordingly, the action and effects as described above can be exerted.

The floating up matters in coagulation are wholly of a porous structure, and the water content of the coagulated matters is lowered.

Because photo-synthetic microorganisms including genera Chlorella, Spirogyra, and Hydrodictyon, and purple non-sulfur bacteria (e.g., *Rhodospirillum rubrum* IFO-3986) and the like are present in sludge mixture solutions, $CO_2$ is modified as $O_2$.

Hence, the floating up matters in coagulation are thus put in aerobic environment, and the occurrence of bad odor generated in anaerobic environment can be prevented.

The present invention additionally provides a sludge treatment agent preferable for the practice of the sludge treatment method described above.

More specifically, the sludge treatment method in accordance with the present invention is fundamentally based on a technical concept of sludge treatment agent containing carbide as the effective component and additionally containing at least one of nitric acid (nitrate) (nitrous acid; nitrite), monosaccharides, and polysaccharides, and/or at least one of reductive bacteria of nitric acid (nitrous acid), microorganisms modifying sugar materials into carbonate gas, microorganisms conducting photo-synthesis, cultures and treated products, if necessary.

The sludge separated in such manner in accordance with the present invention was indicated to be preferable as a raw material of compost, as the consequence of examinations from standpoints in various fields.

The production of compost will now be described below.

So as to produce compost in accordance with the present invention, the floating up sludge in separation is adjusted of its water content (water content of 65 to 95%, preferably 70 to 90%), if necessary, and is then deposited and turned over and stirred, and the procedures may satisfactorily be repeated, and if Actinomycetes, particularly medium temperature- and high temperature Actinomycetes species are added, the preparation of compost is further accelerated.

As the Actinomycetes, use may be made of any bacterium of genus Actinomycetes, satisfactorily, but all of the microorganisms of genera Streptomyces, Thermomonospora, Thermoactinomyces, and Micromonospora may be used singly or in combination of two or more species thereof.

As preferable bacteria, for example, use may be made of *Streptomyces griseorus* IFO 3402, *Streptomyces olivaceus* IFO 3119, *Streptomyces griceus* IFO 3102, *Thermoactinomyces vulgaris* IFO 12516, *Micromonospora brunne* IFO 14069, and *Thermomonospora fusca* IFO 14071 and the like.

As the (se) seed bacteria, a culture containing the bacteria at a total number of $0.5 \times 10^6$/g or more (preferably, $2 \times 10^8$/g or more) may be satisfactory even if the culture is contaminated with other microorganisms. These bacterial strains can 1. prevent the occurrence of fly and insects because the strains decompose the chitin of fly and insect eggs and pupas. 2. These bacterial strains can decompose low fatty acids such as propionic acid and butyric acid and hydrogen sulfide as the components of bad odor. 3. These bacterial strains have a function to decompose tannin and benzoic acid in barks as plant growth inhibiting substances. Due to the function, compost can be prepared in a hygienic manner rapidly. As such seed bacteria, furthermore, isolated microorganisms of themselves may be used; and additionally, cultures and processed products of the(se) microorganism (s), and compost of itself as prepared by using the (se) microorganism(s) by the method of the present invention, may be used as such seed bacteria (culture).

The ratio of the seed bacteria (culture) and sludge to be used is with no specific limitation, but the ratio is 0.1 to 10 parts of sludge to one part of the seed culture, preferably 0.5 to 5 parts of sludge to one part of the seed culture. However, the ratio thereof to be used may satisfactorily depart from the range described above. If the amount of the seed bacteria inoculated is less, the seed bacteria grow over short time, so that the ratio may fall within the preferable range; and if the amount thereof inoculated is more, conversely, no hazardous action is observed.

Because the compost thus produced does not contain coagulants, unlike those by conventional methods, no damage of high concentrations of salts may occur or no hazardous metals and the like against plants and humans and cattle are present, so the compost can be freely applied to rice fields and vegetable fields in a safe manner. Furthermore, the compost of the present invention additionally contains carbon, and therefore, the application of the compost leads to the application of carbon and the solidification and particularization of soil is therefore promoted due to the porosity, so that gas permeability and water permeability can be improved to attain soil improvement; due to the black color (colorability), alternatively, the compost has a greater action of absorbing solar heat, exerting the effects of elevating ground temperature and melting snow, so that plants can be grown efficiently in a safe manner.

The sludge treatment method in accordance with the present invention can be effected by using known sludge treatment systems such as disposable treatment tank conventionally used (although no treatment system for sludge sediment is required); for example, floating up sludge-adsorbed carbide in separation after treatment is simply separated by scooping out the carbide; otherwise, in accordance with the present invention (including floating up sludge, transparent treated water, and partially including precipitated sludge in some case), the entire treated matters are treated with filtration (by means of filter cloth, nets of metal or synthetic resin, other strainers and the like) or centrifugation, to rapidly separate sludge readily, so that sludge can be separated efficiently from the transparent solution. The sludge thus separated can be recycled as compost as described above, and it is of course possible to subject sludge to treatments conventionally practiced, such as incineration treatment. Because the treated water is transparent in preparation after sufficient treatment, the treated water can be discharged into surface water.

It is with no doubt that the sludge treatment method of the present invention may be practiced by utilizing the systems conventionally used (exerting prominent effect of no requirement of sedimentation tank, however), but because a process of floating up sludge thereby separating sludge is newly adopted in accordance with the present invention, the process is absolutely in contrast to the process of precipitating sludge thereby separating sludge according to conventional methods, so the development of a new system to carry out more efficiently the present method was urgent, and eventually, the present inventors have successfully achieved the development of a sludge treatment system particularly preferable for carrying out the present method as the outcome of intensive investigations.

More specifically, the sludge treatment system of the present invention is equipped with a sludge treatment tank which can carry out agitation of sludge and floating up and separation of sludge in a single tank. The sludge treatment tank includes an agitation means, a gas diffusion means to incorporate air from outside and diffuse the air inside and a discharge outlet of treated solution and a means for assaying contents.

Only a single sludge treatment tank can work to float up and separate sludge and reduce the water content in the floating up sludge.

Consequently, a great number of systems conventionally used are not required any more, for example individual systems for filtration, dehydration, drying and incineration of sludge matters settled with a sludge coagulant such as aluminium sulfate and calcium hydroxide.

Accordingly, the sludge treatment system of the present invention is simple of a small type, and therefore, the equipment cost is small, involving less economical burden, and the operation is simple so the running cost can be reduced.

As a second embodiment of the sludge treatment system, use may satisfactorily be made of a system including an aeration tank to put a sludge mixture solution at an aerated state and a sludge floating up and separation tank in communication with the aeration tank, wherein the two tanks are in a pair.

And the aeration tank includes a sediment transfer means to transfer sediment to the sludge floating up and separation tank, a treated solution transfer means to transfer the treated solution to the sludge floating up and separation tank, and a gas diffusion means to incorporate air from outside and diffuse the air inside. Furthermore, the sludge floating up and separation tank includes an agitation means, a discharge outlet of treated solution and a means for assaying contents.

By means of the aeration tank and sludge floating up and separating tank, sludge can be floated up and separated, and the water content in the floating up sludge can be reduced.

Consequently, a great number of systems conventionally used are not any more required, so that the system operation can be done economically.

EXAMPLE 1

The sludge treatment method of the present invention will now be described.

Into 300 liters of a back sludge mixture solution from night soil treatment plant (200 t/day) were added 200 liters of waste water from a joint purifying tank, followed by aeration (2.5 liters/min, 20° C.) for 30 hours. The change of the bacterial number therein during the treatment of waste water is shown in Table 1.

Table 1 is the same as used in Fundamental Experimental Example 1. The Table 1 shows the change of the number ($\times 10^2$/ml) of microorganisms involved in the nitrogen cycle and carbonate gas generation in the mixture solution.

Based on the above results, it was verified that nitrifying bacteria, denitrifying bacteria and microorganisms generating carbonate gas from sugar materials are coexisting in the sludge mixture solution at an aerated state.

As to the number of microorganisms over the aeration time, consequently, it was observed the increase of protein decomposition bacteria such as those of genus Bacillus to generate nitrogen of ammonia form ($NH_3$—N) as well as subsequent generation of nitrogen of nitrous acid form ($NO_2$—N), nitrogen of nitric acid form ($NO_3$—N) and the like, following the increase of microorganisms oxidizing ammonia, such as genera Nitrosomonas and Nitrobacter. Furthermore, because the increase of the number of bacteria reducing nitrous acid and nitric acid was observed to be slight, it was considered that the denitrifying action ($NO_3 \rightarrow NO_2 \rightarrow N_2O \rightarrow N_2$) of bacteria reducing nitrous acid and nitric acid and genus Micrococcus was mild at such state.

The number of yeast bacteria responsible for the generation of $CO_2$ gas is constant, irrespective of the course of aeration. Thus, the $CO_2$ gas generation mechanism (described below) through the addition of sugar materials, for example starch, maltose, and glucose, and the like, is demonstrated.

$$(C_6H_{10}O_5)n + n/2H_2O \rightarrow n/2C_{12}H_{22}O_{11} + n/2H_2O \rightarrow 2nC_6H_{12}O_6 \rightarrow 4nCO_2 + 4nH_2O \quad (n=400\sim2000)$$

The back sludge mixture solution from the night soil treatment plant (200 t/day) was placed in a 50-ml Nessler tube, followed by addition of active charcoal of the composition shown in Table 3 to 0.2 w/v % and addition of sodium nitrate to 50 ppm as nitrogen of nitrous acid form.

TABLE 3

| | |
|---|---|
| pH | 7.3–7.5 |
| C (%) | 98.0–99.5 |
| Ash | 0.5–1.2 |
| $SiO_2$ (% in ash) | 2.7–72 |
| MgO (% in ash) | 10.5–40 |
| CaO (% in ash) | 5.8–25 |
| $K_2O$ (% in ash) | 4.5–30 |

According to the results, the floating up sludge was reduced to 40% in volume ratio, 2 days later, and reduced to 26% in volume ratio, 3 days later. Additionally, the water in the floating up sludge was reduced to 94% 3 days later, from the 99.3%.prior to separation.

The change of the components is shown in Table 4.

TABLE 4

| | Prior to separation | After separation | Reduction ratio (%) |
|---|---|---|---|
| pH | 7.8 | 7.5 | |
| SS(ppm) | 7240 | 10 | 99.9 |
| SVI (ml) | 136 | 999 | 86.4 |
| Transparency (mm) | 5 | 300 | 99.5 |
| $NO_2$-N (ppm) | 55 | 0.3 | 94.5 |
| Cl (ppm) | 598 | 600 | — |
| Total nitrogen (ppm) | 5600 | 400 | 92.9 |

Table 4 shows the change of the composition of the back sludge mixture solution, between prior to the addition of active charcoal into 50 liters of the sludge mixture solution and 50 hours after the addition of 100 g of active charcoal thereto. As shown in Table 4, the reduction ratios of all of the suspended solid matters (SS), sludge volume index (SVI), transparency, nitrogen of nitrous acid form and total nitrogen were 86% or more, which are very good results.

Into a sludge mixture solution were added variable combinations of active charcoal and sodium nitrite at various amounts as described in (1) to (5). In that case, the floating up status of the suspended solid matters was observed. Consequently, a space was generated between the floating up, suspended solid matters and the liquid.

The following cases are shown;
(1) no addition of active charcoal or sodium nitrite (control);
(2) addition of active charcoal at 0.2 w/v %;
(3) addition of active charcoal at 0.2 w/v % and 0.1 N sodium nitrite at 2 w/v %;
(4) addition of active charcoal at 0.4 w/v % and 0.1 N sodium nitrite at 0.4 w/v %; and
(5) addition of active charcoal at 0.4 w/v % and 0.1 N sodium nitrite at 4 w/v %.

So as to elucidate the causal factor to float up the suspended solid matters in the sludge mixture solution, then, various additives were added to the solution, to measure EH (force over electric field $H_2$) and rH (redox potential) prior to and after the floating up of sludge. The results of the measurement are shown in Table 5.

TABLE 5

| | pH | EH (mv) | rH ($N_2$ purging) |
|---|---|---|---|
| Control | 8.0 | −3 | 13.9 |
| Carbon black | 8.2 | 70 | 19.2 |
| Charcoal powder | 7.8 | 52 | 18.6 |
| Palm shell charcoal powder | 7.9 | 76 | 18.7 |
| Pulp charcoal powder | 8.2 | 65 | 18.2 |
| Humic acid powder | 7.2 | 42 | 16.2 |

Compared with the control with no addition of additives, those with addition of additives had EH from −3 mV to 42 mV and higher rH values of 30% or more.

Consequently, denitrifying bacteria were grown, and due to the action, $NO_2$ was reduced (see Table 4), while $N_2$, $CO_2$, $O_2$ and the like were generated. Through the synergistic action of the buoyancy of these gases with the adsorption force of the suspended solid matters, sludge floated up, and excess amounts of the gases generated a space between the floating up solid matters in suspension and the liquid. Then, the floating up solid matters in suspension were further dried, so that it was considered that the water content was reduced.

EXAMPLE 2

Figure 3:
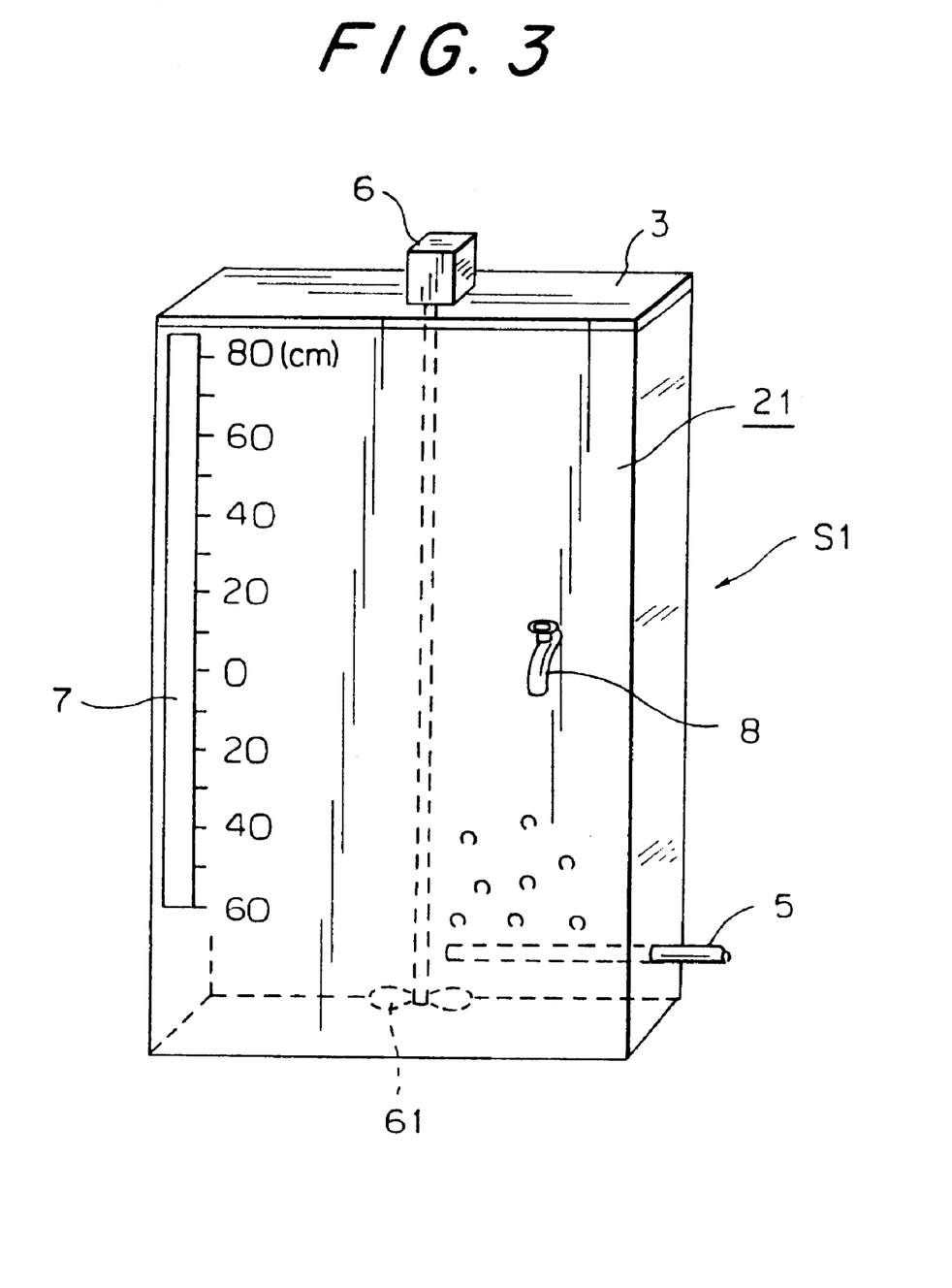
FIG. 3 is a perspective view of the sludge treatment system of the present invention.

A method for floating up and separating sludge will now be described by using sludge treatment system S1 shown in FIG. 3 in accordance with the present invention.

Active sludge wherein microorganisms including nitrifying bacteria and nitrate reductive bacteria are incubated is placed in sludge treatment tank 21 up to the position of the approximate center thereof. Then, a back sludge mixture solution from a night soil treatment plant (200 t/day) is placed in the sludge treatment tank 21. By incorporating air from outside by means of diffuser 5 for diffusion, aeration is effected (2.5 liters/min, 20° C.) for 30 hours. After aeration, a transparent solution collected upward is discharged from treated solution discharge outlet 8 to the outside.

Thereafter, the activities of bacteria reducing nitrous acid and nitric acid are assayed by the method performed in Example 1. Subsequently, the volume of the contents of the sludge mixture solution and the like is to be confirmed by transparent content measurement gauge 7. Alternatively, it is confirmed that the level of nitrogen of nitric acid form in the treated solution is 5 ppm or more. If insufficient, nitric acid, nitrous acid and salts thereof are added so that the final level of nitrogen of nitric acid form might be 5 ppm or more.

After further adding any of adsorbents including particle charcoals such as active charcoal, bamboo charcoal, wood charcoal, pulp charcoal and palm shell charcoal, humic acid charcoal, carbon black and other carbides singly or a mixture thereof into a sludge mixture solution at 0.05% or more, the resulting mixture is agitated and mixed together with agitator 6. After subsequently leaving the mixture to stand as it was, most of sludge floated up to the upper layer within one day, and 5 days later, a space comprising $N_2$, $CO_2$, $O_2$ and the like was generated between the sludge and the water surface, to recover sludge at a water content of 95% or less. The sludge can be readily fractionated by means of net or strainer by opening lid 3 arranged on the upper part of the sludge treatment tank 21.

Description has been made about a case that the sludge treatment tank 21 composing the sludge treatment system S1 is one unit, but a plurality of such units may be linked together for use. Additionally, description has been made of an example wherein treatment is effected by using sludge not yet aerated in the sludge treatment tank 21, but any of sludge aerated in other systems and sludge in a mixture of both the types of sludge may be treated (in the tank).

The floating up and separation system S1 described with reference to FIG. 3 comprises sludge treatment tank 21 alone, but with reference to FIGS. 4 and 5, a case that a floating up and separation system comprises a pair of an aeration tank and a sludge floating up and separation tank will be described.

Figure 4:
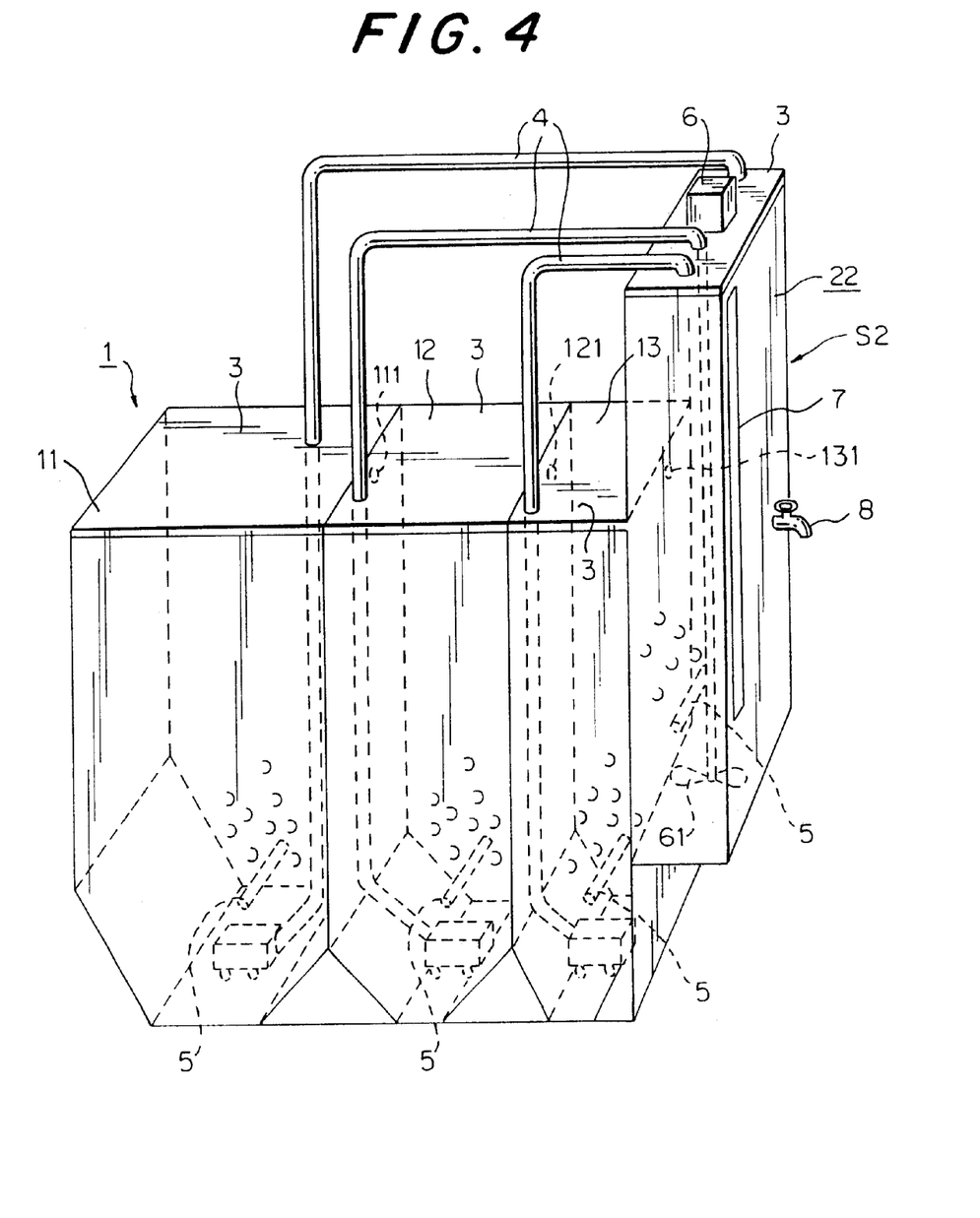
FIG. 4 is a perspective view depicting another example of the sludge treatment system of the present invention.
Figure 5:
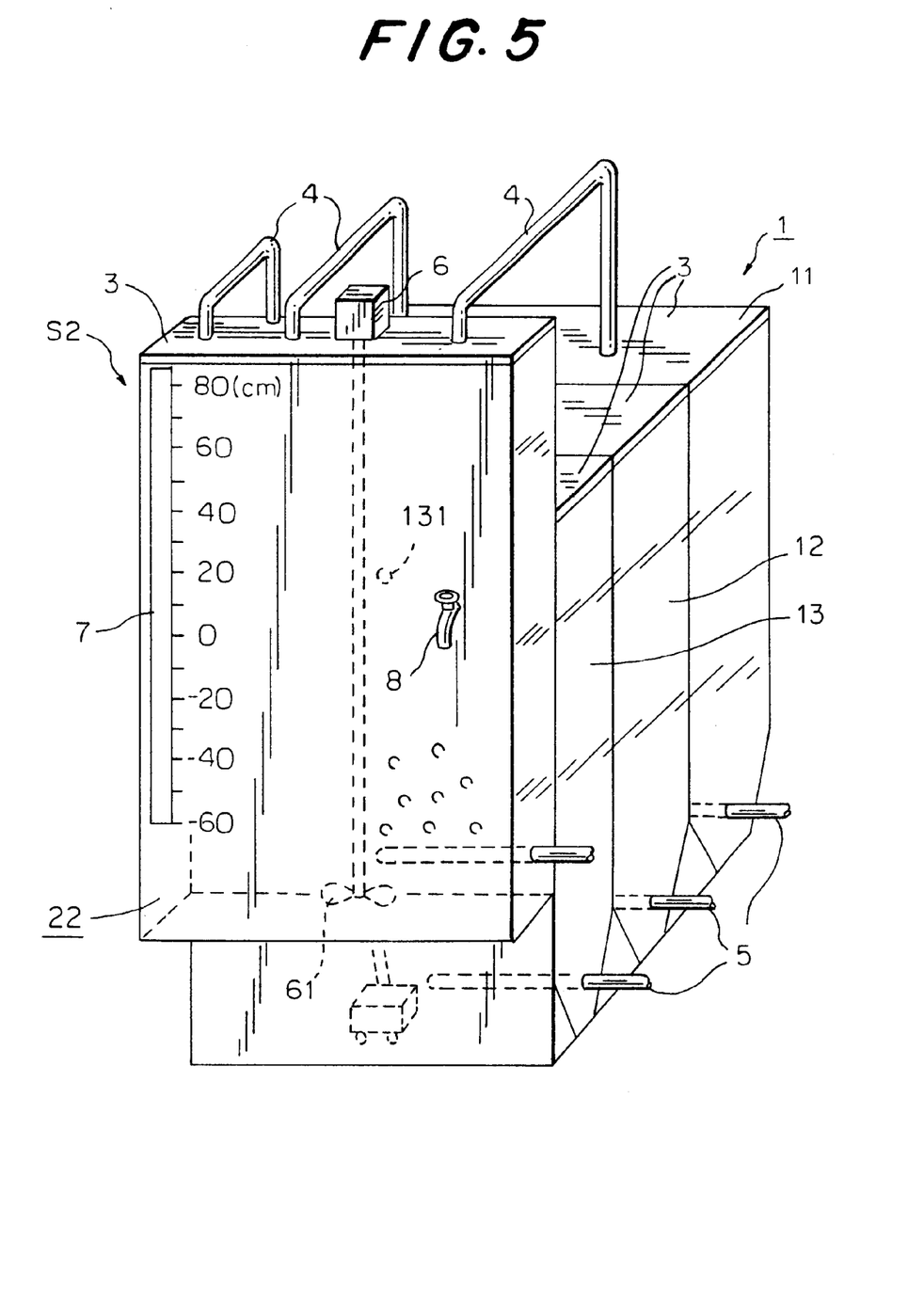
FIG. 5 is a perspective view of a sludge floating up and separation tank composing the sludge treatment system shown in FIG. 4.

FIG. 4 is a perspective view depicting one example of the sludge treatment system in accordance with the present invention; and FIG. 5 is a perspective view depicting the sludge floating up and separation tank composing the floating up and separation system of sludge as shown in FIG. 4.

In the figures, S2 represents a sludge treatment system. The sludge treatment system S2 comprises aeration tank 1 to prepare a sludge mixture solution at an aerated state and sludge floating up and separation tank 22.

The aeration tank 1 is composed of three partial aeration tanks 11, 12 and 13. Lid 3 for placing a sludge mixture solution is arranged on the upper part of the partial aeration tanks 11, 12 and 13. Herein, the aeration tank 1 and the sludge floating up and separation tank 22, and the lid 3 are made of photo-transmission materials, for example plastics or glass, transparent or semi-transparent. On the partial aeration tanks 11, 12 and 13 are arranged sediment transfer tubes 4, 4, 4 to feed sediment into the sludge floating up and separation tank 22.

Treated solution transfer holes 111, 121, 131 to feed treated solution toward the sludge floating up and separation tank 22 are arranged between the partial aeration tanks 11 and 12, between the partial aeration tanks 12 and 13, and between the partial aeration tank 13 and the sludge floating up and separation tank 21, respectively. On the lower parts of the partial aeration tanks 11, 12, 13 are arranged diffusion disks 5, 5, 5 to incorporate air from outside and diffuse air inside.

The sludge floating up and separation tank 22 is adjacent to the partial aeration tank 13. On the upper part of the sludge floating up and separation tank 22 is arranged the lid 3. Inside the sludge floating up and separation tank 22 is arranged agitator 6 with agitation wing 61. On the side wall is arranged contents measuring gauge 7. The contents measuring gauge 7 is made of a transparent board so as to observe the contents outside. Additionally, treated solution discharge outlet 8 is arranged on another part of the side wall.

In FIG. 4, the floating up and separation tank 22 of sludge mixture solution is adjacent to the partial aeration tank 13, but the tank 22 may satisfactorily be arranged to be apart therefrom.

A method for floating up and separating sludge by using the floating up and separation system S2 of sludge solution is described.

A back sludge mixture solution from a night soil treatment plant (200 t/day) is placed in the partial aeration tanks 11, 12, 13. Aeration is effected (2.5 liters/min, 20° C.) by means of the diffusion disk 5 for 30 hours.

After aeration, a transparent treated solution collected on the upper parts of the partial aeration tanks 11, 12, 13 is transferred through the treated solution transfer holes 111, 121, 131 into the inside of the sludge floating up and separation tank 22. Then, the transparent treated solution is discharged from the treated solution discharge outlet 8 to the outside. The sludge mixture solution settled on the lower part is transferred through sediment transfer tube 4 into the sludge floating up and separation tank 22.

The activities of bacteria reducing nitrous acid and nitric acid in the sludge mixture solution were assayed by the method as in Example 1. Then, the contents of the sludge mixture solution and the like are confirmed through the transparent contents measuring gauge 7. Alternatively, it is also confirmed that the nitrogen of nitric acid form in the treated solution is 5 ppm or more. If insufficient, nitric acid, nitrous acid and salts thereof are added (into the solution), so that the nitrogen of nitric acid form might be 5 ppm or more.

After further adding any of adsorbents including particle charcoals such as active charcoal, bamboo charcoal, wood charcoal, pulp charcoal and palm shell charcoal, humic acid charcoal, carbon black and other carbides singly or a mixture thereof into a sludge mixture solution at 0.05% or more, the resulting mixture is agitated and mixed together with the agitator 6. After subsequently leaving the mixture to stand as it was, most of sludge floated up to the upper layer within one day, and 5 days later, a space comprising $N_2$, $CO_2$, $O_2$ and the like was generated between the sludge and the water surface, to recover sludge at a water content of 95% or less. The sludge can be readily fractionated by means of net or strainer from the sludge floating up and separation tank 22.

EXAMPLE 3

A mixture of pulverized crab shell and oil cake at a ratio of 2:8 was prepared, to which calcium powder was added, followed by pH adjustment to 7.5 to 8.0, and the entirety was sterilized at 120° C., which was defined as a culture medium. Into the resulting culture medium of 1 kg was inoculated *Streptomyces griseorus* IFO 3402, which was then left to stand at room temperature for one week, until the entire surface turned white because of the proliferation of Actinomycetes, to recover about 1 kg of an Actinomycetes culture.

In the same manner, cultures of *Streptomyces griseus* IFO 3102, *Thermoactinomyces monosporus* IFO 14050, *Micromonospora brunne* IFO 14069 *and Thermomonospora husca* IFO 14071 were recovered. By mixing equal amounts of these bacterial cultures, a mixture (20 kg) of the total bacterial cell number of $5\times10^8$/g and a water content of 40% was recovered.

As compost materials, two sets of sludge (20 kg; adjusted to 80% water content) floated up and separated in Example 1 were prepared, and one set was mixed with 20 kg of the seed bacteria mixture (20 kg) recovered above, which was defined as equal lot. Alternatively, the other set was mixed with 40 kg of the seed bacteria mixture, which was defined as 2-fold lot.

The equal lot and 2-fold lot were individually placed in a gas-permeable bag, and were left to stand therein at room temperature, namely 10 to 20° C., and consequently, the temperature at the center of the deposit was 50° C. in about 20 hours, while the temperature reached 65° C. in 30 hours.

At that timing, agitation was effected to unify the product temperature and water content, and then, the lots were deposited again, and for 3 days thereafter, the same procedure as the first procedure was conducted, and consequently, the product temperature was lowered to 40° C. 4 days later, while the temperature was lowered to 35° C. 5 days later. During that time, no bad odor or fly or insect developed, and the cell number of Actinomycetes in the treated matters reached $1\times10^9$/g, both in the equal lot and 2-fold lot, 7 days later. A part thereof was recycled as seed bacteria for a second treatment of fresh sludge, while the remaining one was additionally aged for 2 weeks, and the resulting one could be used as compost.

Consequently, as to the elevation of the product temperature in the 2-fold lot of sludge and the seed bacteria, the elevation of the product temperature was slightly less, compared with the equal lot, while the BOD reduction rate was at a slightly large value and the reduction rate of the amount of low fatty acids (causing) bad odor was at a slightly large value. Alternatively, the BOD value and the amount of low fatty acids as bad odor components were reduced to 20% or below 20%, and it was demonstrated that the reduction thereof was more prominent at the first time than at the second time. Based on the results, it was verified that the present method was effectively utilized for continuous treatment, by using the treated matter recovered at the first sludge treatment, as seed bacteria.

EXAMPLE 4

Into the sludge (adjusted to a water content of 80%) recovered by floating up and separation in Example 2 was mixed the sludge (100 kg) at the cell number of Actinomycetes ($1\times10^9$/g) and a water content of 35%, 6 days after the treatment as recovered in Example 3, as seed bacteria. The resulting mixture was deposited in a mountainous shape and left to stand at room temperature from 10° C. to 20° C., and consequently, the mixture reached 55° C. in about 20 hours and 68° C. in 30 hours. At that timing, the mixture was agitated, to unify the product temperature and water content, and thereafter, the mixture was again deposited, which was then subject, for 3 days, to the same procedure as the procedure at the first time. Consequently, the product temperature was 45° C., 4 days later, and the temperature was lowered to 25° C., 5 days later. During the period, no occurrence of bad odor or fly or insect was observed, and the treated matters reached the cell number of Actinomycetes of $2\times10^9$/g, 7 days later. A part thereof was recycled for treating fresh foodstuff garbage as seed bacteria, while the remaining one could be used as compost, 2 weeks after additional aging.

The change of the product temperature, the change of BOD and the results of the analysis of low fatty acids as bad odor components by gas chromatography were the same as the results in Example 3.

Advantages of the Invention (a) Nitrifying bacteria and bacteria reducing nitric acid and microorganisms generating carbonate gas from sugar material are present in a sludge mixture solution at an aerated state. When powdery or particle charcoal (carbide) is added to the solution, firstly, charcoal adsorbs sludge. After adsorption of sludge, $N_2$ generated by bacteria reducing $NO_2$ and $NO_3$, and $CO_2$ from sugar materials are adsorbed individually onto the charcoal, so that the sludge floats up together with charcoal.

A transparent solution is observed on the lower part of the floating up sludge. The phenomenon is owing to the adsorption of sludge onto active charcoal and the thorough floating up of sludge due to the action such as buoyancy due to $N_2$, $CO_2$ and $O_2$ and the like from the reduction of nitrous acid and nitric acid in the sludge mixture solution because the sludge mixture solution falls from the aerated state to the reduced state. The floating up sludge contains less water and more solid matters, so the sludge can be fractionated in a simple manner.

By adsorbing sludge onto active charcoal and the like thereby coagulating the sludge and floating up the sludge coagulated matters in coagulation in gases generated through the action of the microorganisms in the sludge to separate the sludge from the treated water, sludge recycling can be attained, for example including preparation of compost from sludge. Because the water content in the coagulated matters is less, the floating up matters in coagulation can be harvested readily.

Because the charcoal in the coagulated matters adsorbs $O_2$ and because the floating up matters in coagulation is of a porous structure, and the like, furthermore, the sludge in the coagulated matters is in aerobic environment, whereby the generation of bad odor can be prevented.

(b) The generation source of $N_2$, $CO_2$, $O_2$ and the like in a sludge mixture solution at an aerated state or after aeration, into which nitrite salt or nitrate salt is preliminarily added and charcoal is subsequently added, is the nitrous acid and nitric acid in the sludge mixture solution as well as the nitrous acid, nitric acid, and salts thereof added singly or in combination from the outside, and therefore, $N_2$, $CO_2$, $O_2$ and the like are far more generated.

Thus, the gases more generated and the like further push up the floating up sludge, and an air layer is generated between the floating up sludge and the remaining treated water. Consequently, the floating up sludge is completely separated from the remaining water after treatment, and therefore, the sludge is rapidly dried and separated in a more simple fashion.

(c) The generation source of $N_2$, $CO_2$, $O_2$ and the like in a sludge mixture solution at an aerated state or after aeration, into which sugar materials are preliminarily added and charcoal is subsequently added, is the nitrous acid and nitric acid in the sludge mixture solution as well as the sugar materials added extraneously, and therefore, $N_2$, $CO_2$, $O_2$ and the like are far more generated.

Thus, the gases more generated and the like further push up the floating up sludge, and a spatial layer is generated between the floating up sludge and the remaining treated water. Consequently, the floating up sludge is completely separated from the remaining water after treatment, and therefore, the sludge is rapidly dried and separated in a more simple fashion.

(d) By adding at least one of bacteria reducing nitric acid (nitrous acid), microorganisms (yeast and others) modifying sugar materials into carbonate gas, cultures thereof, and treated matters thereof, the aforementioned effects can be further enhanced.

(e) Hence, the present invention is to provide a sludge treatment agent containing at least one of nitric acid (nitrous acid) (salts), sugar materials, and the aforementioned microorganisms (culture, treated matters), other than carbide, and when the present treatment agent packed in one package or divided into a number of packages is used, liquid waste can be treated in a very simple manner.

(f) Compost can be prepared from the floating up and separated sludge in accordance with the present invention as a raw material, and the resulting compost can improve the physico-chemical properties of soil in addition to the fertilization potency thereof, and the compost is additionally safe. If used in combination with Actinomyces, these effects can be promoted.

(g) If the sludge treatment system of the present invention (for example, embodiment 1 composed of a single sludge treatment tank and embodiment 2 composed of aeration tank and sludge floating up and separation tank) is used, the sludge treatment method of the present invention can be more efficiently promoted.

More specifically, sludge is simply floated up and separated with the sludge treatment tank in the embodiment 1, and with the aeration tank and the sludge floating up and separation tank in the embodiment 2, furthermore, the water content in the floating up sludge can be reduced.

Therefore, no systems are required for settling sludge with coagulants such as aluminium sulfate and calcium hydroxide and for the separation and filtration, dehydration, drying and incineration of the sediment.

Accordingly, the sludge treatment system of the present invention is simple of a small type, and therefore, the equipment cost is small, and the running cost can be reduced.

(h) The floating up and separated sludge may satisfactorily be separated and removed by for example scooping out, in a short time after floating up, but if the time passes after floating up, once floating up sludge may be precipitated partially. Even in such case, however, the whole treatment matter and/or only the liquid portion containing settled sludge can be filtered and centrifuged, whereby sludge can be separated more readily and efficiently. Even in such case, therefore, the use of coagulants or the arrangement of sedimentation tanks is not required.

What is claimed is:

1. A process for treating sludge which comprises adding powdery and/or particulate carbide into sludge, aerating the resulting sludge, followed by allowing the aerated sludge to stand and then removing a floated-up mixture containing sludge and carbide.

2. The process for treating sludge according to claim 1, wherein at least one member selected from the group consisting of nitric acid, nitrous acid, and salts thereof is added before the aerated sludge is allowed to stand.

3. The process for treating sludge according to claim 2, wherein at least one member selected from the group consisting of monosaccharides and polysaccharides is added before the aerated sludge is allowed to stand.

4. The process for treating sludge according to claim 3, wherein the sludge to be treated contains live photosynthetic microorganisms.

5. The process for treating sludge according to claim 2, wherein the sludge to be treated contains live photosynthetic microorganisms.

6. The process for treating sludge according to claim 1, wherein at least one member selected from the group consisting of monosaccharides and polysaccharides is added before the aerated sludge is allowed to stand.

7. The process for treating sludge according to claim 6, wherein the sludge to be treated contains live photosynthetic microorganisms.

8. The process for treating sludge according to claim 1, wherein the sludge to be treated contains live photosynthetic microorganisms.

9. A process for treating sludge which comprises aerating sludge, adding powdery and/or particulate carbide into the aerated sludge, followed by stirring, allowing the stirred aerated sludge to stand, and then removing a floated-up mixture containing sludge and carbide.

10. The process for treating sludge according to claim 9, wherein at least one member selected from the group consisting of nitric acid, nitrous acid, and salts thereof is added before the stirred aerated sludge is allowed to stand.

11. The process for treating sludge according to claim 10, wherein at least one member selected from the group consisting of monosaccharides and polysaccharides is added before the stirred aerated sludge is allowed to stand.

12. The process for treating sludge according to claim 11, wherein the sludge to be treated contains live photosynthetic microorganisms.

13. The process for treating sludge according to claim 10, wherein the sludge to be treated contains live photosynthetic microorganisms.

14. The process for treating sludge according to claim 9, wherein at least one member selected from the group consisting of monosaccharides and polysaccharides is added before the stirred aerated sludge is allowed to stand.

15. The process for treating sludge according to claim 14, wherein the sludge to be treated contains live photosynthetic microorganisms.

16. The process for treating sludge according to claim 9, wherein the sludge to be treated contains live photosynthetic microorganisms.

* * * * *